United States Patent [19]
Chakrabarti et al.

[11] Patent Number: 6,125,361
[45] Date of Patent: Sep. 26, 2000

[54] FEATURE DIFFUSION ACROSS HYPERLINKS

[75] Inventors: Soumen Chakrabarti, San Jose; Byron Edward Dom, Los Gatos, both of Calif.

[73] Assignee: International Business Machines Corporation, Armonk, N.Y.

[21] Appl. No.: 09/058,635

[22] Filed: Apr. 10, 1998

[51] Int. Cl.[7] .................................................. G06F 17/30
[52] U.S. Cl. .................... 707/3; 707/7; 707/1; 707/4; 707/5; 707/6
[58] Field of Search ................ 707/1, 3, 5, 4, 707/6, 7; 709/217, 218

[56] References Cited

U.S. PATENT DOCUMENTS

| | | | |
|---|---|---|---|
| 5,802,515 | 9/1998 | Adar et al. | 707/5 |
| 5,845,278 | 12/1998 | Kirsch et al. | 707/3 |
| 5,875,446 | 2/1999 | Brown et al. | 707/3 |
| 5,920,854 | 7/1999 | Kirsch et al. | 707/3 |
| 5,920,859 | 7/1999 | Li | 707/5 |
| 5,953,718 | 9/1999 | Wical | 707/5 |

FOREIGN PATENT DOCUMENTS

| | | |
|---|---|---|
| 0 809 197 A2 | 11/1997 | European Pat. Off. |
| WO 97/49048 | 12/1997 | WIPO |

OTHER PUBLICATIONS

"An Extended Vector–Processing Scheme For Searching Information In Hypertext Systems", J. Savoy, *Information Processing & Management*, vol. 32, No. 2, pp. 155–170, 1996.

*Primary Examiner*—Thomas G. Black
*Assistant Examiner*—Diane D. Mizrahi
*Attorney, Agent, or Firm*—Gray Cary Ware Freidenrich

[57] ABSTRACT

A system and method for ranking wide area computer network (e.g., Web) pages by popularity in response to a query. Further, using a query and the response thereto from a search engine, the system and method finds additional key words that might be good extended search terms, essentially generating a local thesaurus on the fly at query time.

36 Claims, 5 Drawing Sheets

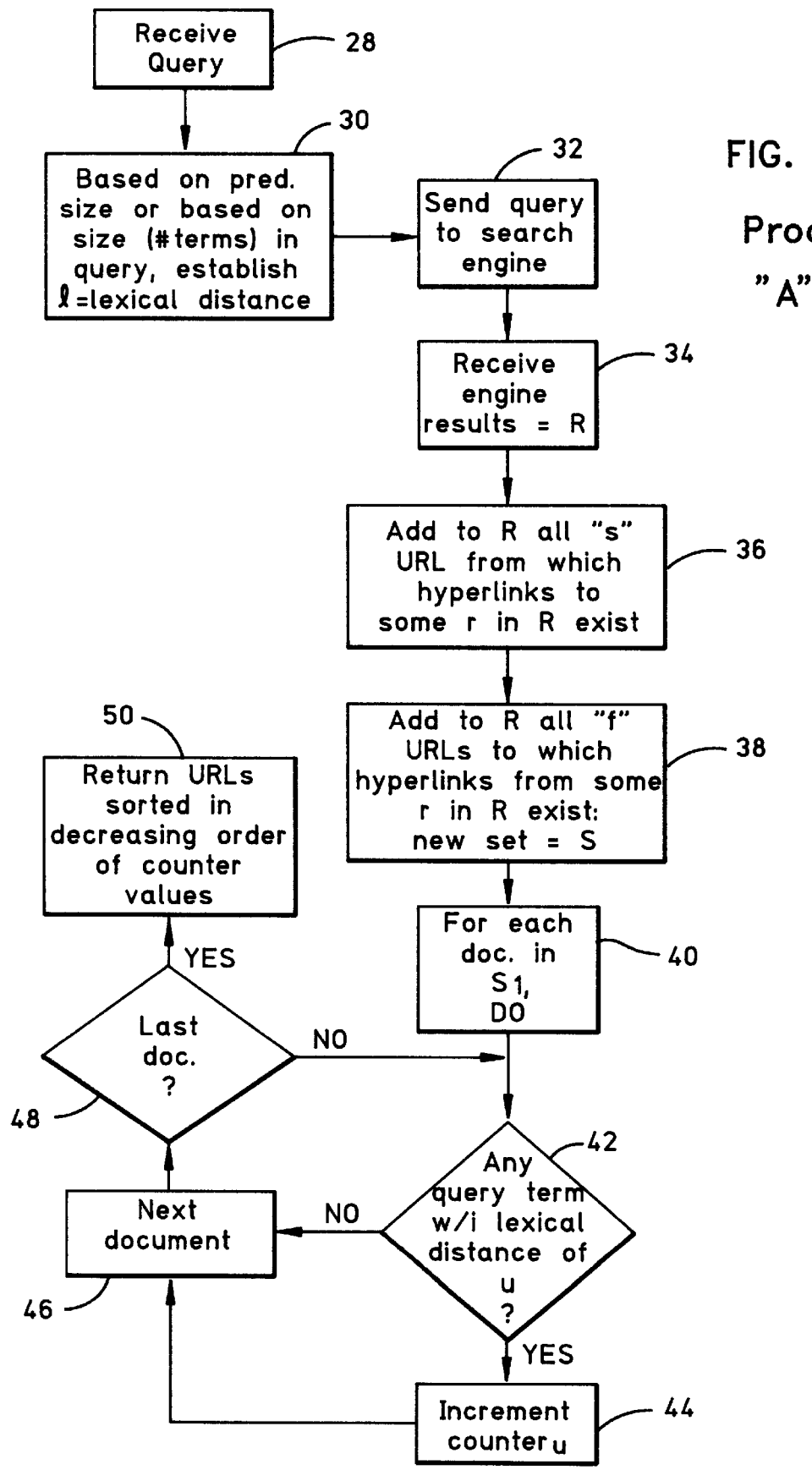
FIG. 3 Proc. "A"

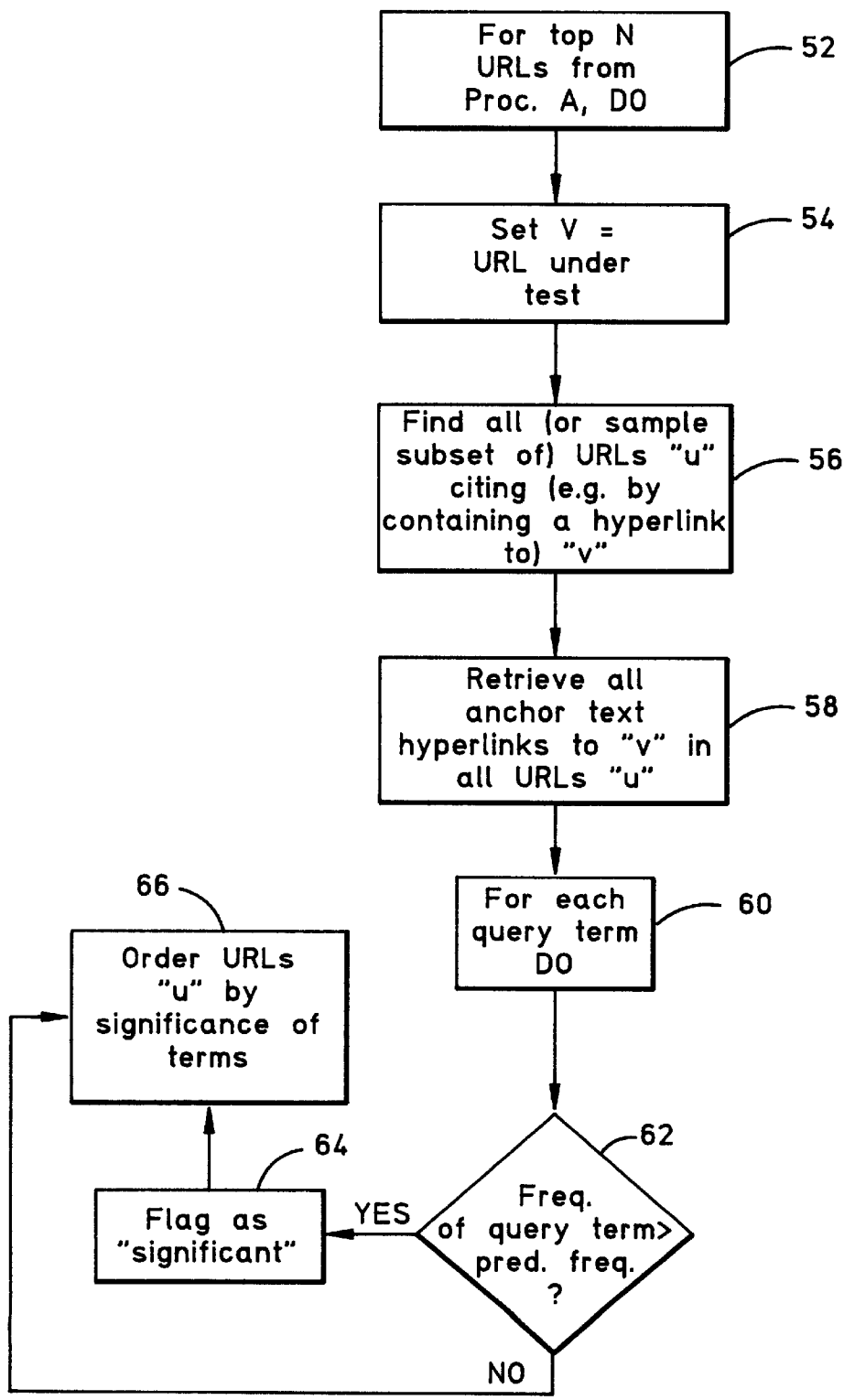

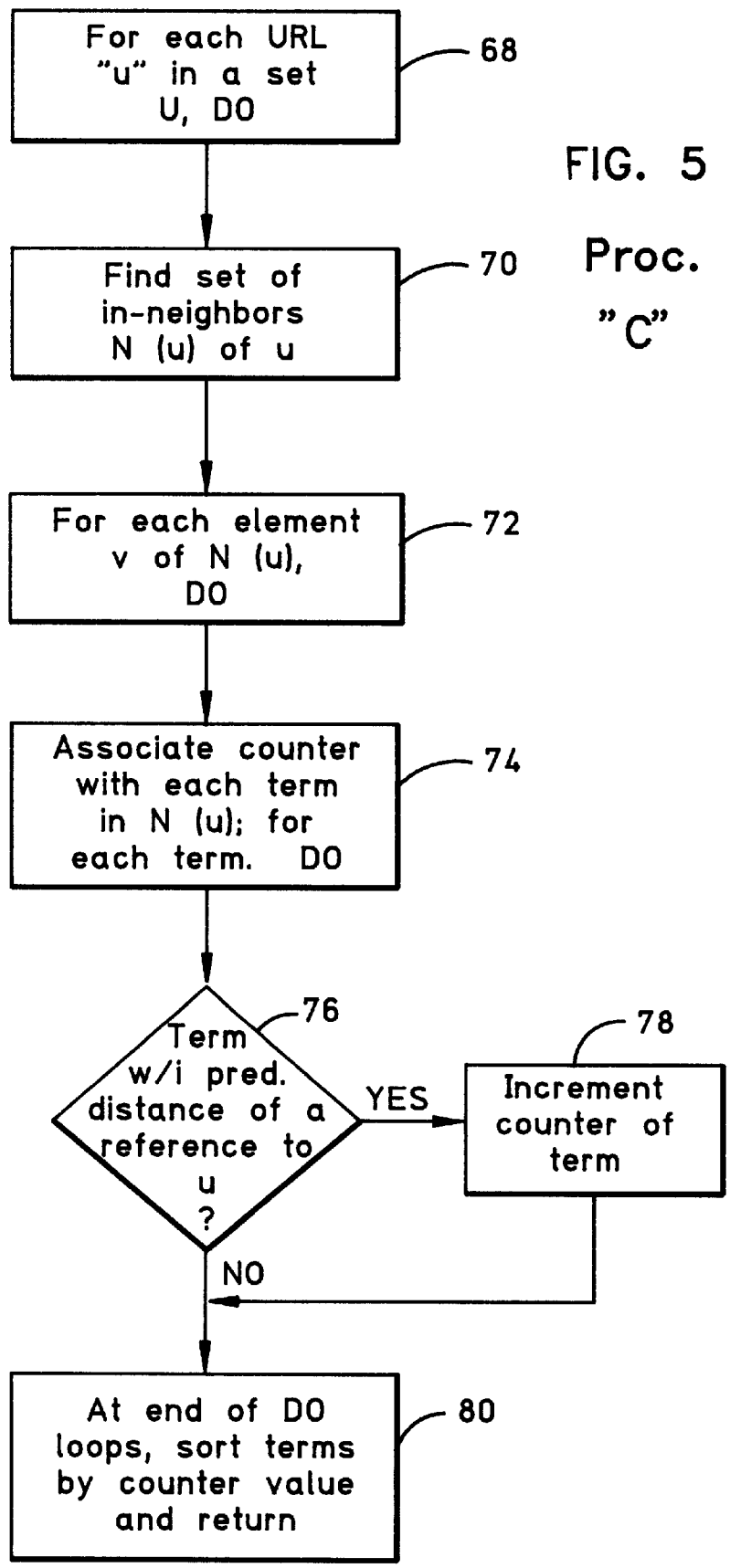

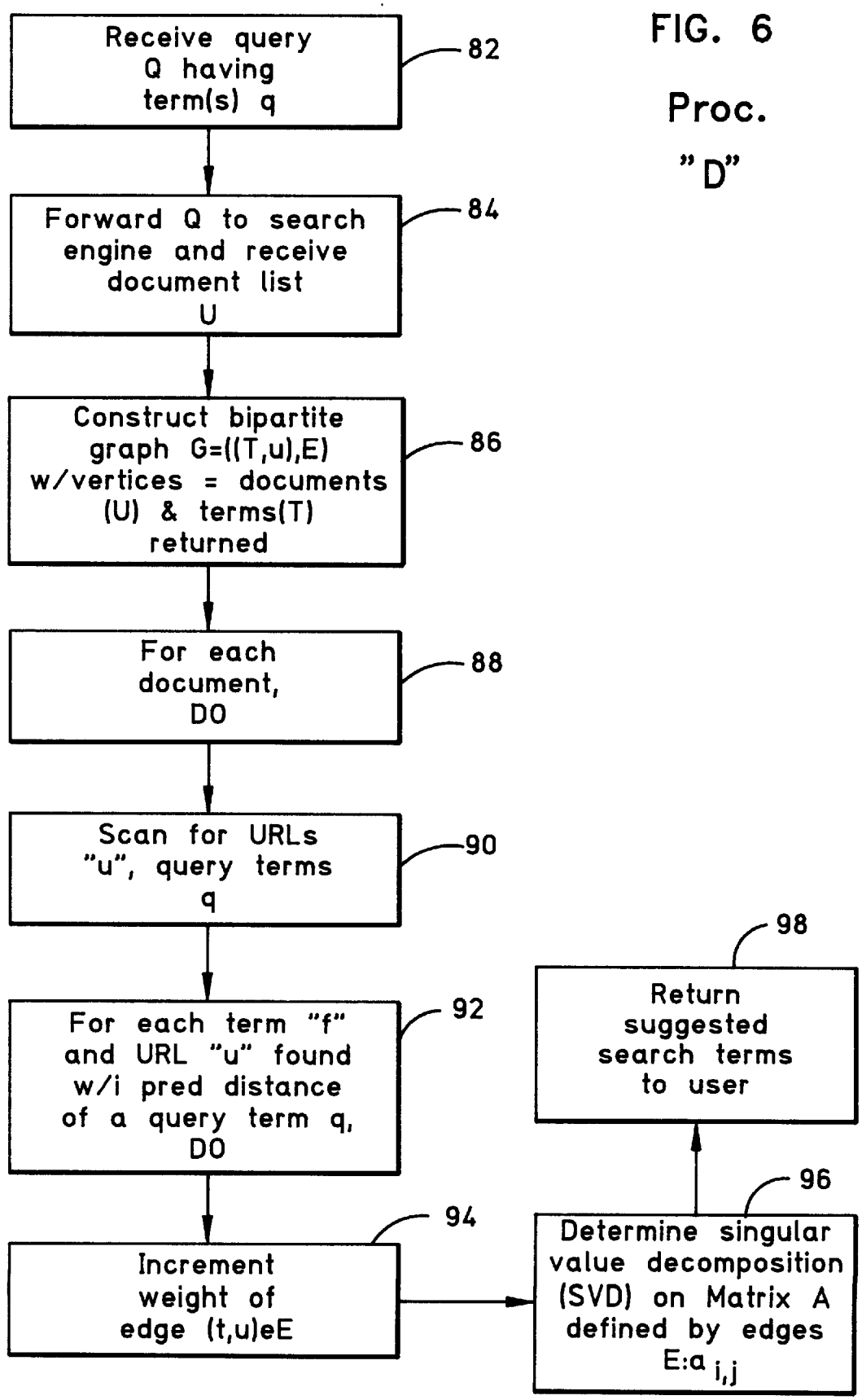

FEATURE DIFFUSION ACROSS HYPERLINKS

BACKGROUND OF THE INVENTION

1. Field of the Invention

The present invention relates generally to information retrieval, and more particularly to methods and apparatus for efficiently and effectively retrieving hypertext documents on, e.g., the World Wide Web.

2. Description of the Related Art

The wide area computer network known as the Internet, and in particular the portion of the Internet known as the World Wide Web, affords users access to a large amount of information. Not surprisingly, several search engines have been provided into which users can input queries, and the search engines use various schemes to return lists of Web sites in response to the queries, to facilitate the mining of information from the Web. These Web sites generally represent computer-stored documents that a user can access to gain information regarding the subject matter of the particular site.

Typically, like most computer search methods, Web search engines use some form of key word search strategy, in which the term or terms of a user's input query are matched with terms in Web documents in some fashion to return a list of pertinent Web sites to the querying user. It happens, however, that most queries are only one to three words in length and, thus, are usually very broad. This means that a large number of Web sites might contain one or more words of a query, and if the search engine returns all possible candidates, the user might be required to sift through hundreds and perhaps thousands of documents.

Furthermore, it might happen that in response to a query, the Web sites that are most pertinent to the query might not be returned at all. More specifically, a query might use terms that do not appear in the Web sites that are the most pertinent to the query. For example, the term "browser" does not appear at all in the Web sites for two of the currently most popular browsers. Instead, the Web sites use words other than "browser" to refer to the subject matter of the sites. Consequently, these sites would not be returned to a user who inputs the word "browser" to a search engine that uses a simple key word search strategy.

As recognized by the present invention, however, Internet users unconsciously collaborate in searching for, reading through, reviewing, and judging the quality of Web documents. This collaboration is reflected in large part by the compilation of Web pages, in that many if not most Web pages typically describe and point to other pages that are perceived to be high-quality.

More particularly, a Web page points to other Web pages in the form of hyperlinks, which essentially are references in a first document (i.e., a first Web page) to other documents (i.e., other Web pages). A hyperlink affords a user the ability to select immediate access to another Web page by "clicking" on the hyperlink by means of a computer mouse or other pointing and clicking device. As recognized herein, such referring Web pages can be a rich source of terms that have been popularly associated with referred-to Web pages even if the referred-to Web pages do not themselves use the terms. Consequently, these terms can be used to improve Web search query results. The present invention further recognizes that the present principles of effectively diffusing features (in the form of terms) across a reference to a document (such as a hyperlink) are applicable not only to the Web but also to any body of linked documents, such as patents, academic papers, articles, books, emailings, etc.

Accordingly, it is an object of the present invention to provide a method and system for diffusing features across hyperlinks. Another object of the present invention is to provide a method and system for ranking documents in a set of documents in response to a query. Still another object of the present invention is to provide a method and system for finding key words in a set of documents. Yet another object of the present invention is to provide a method and system for finding associations in computer-stored documents between document terms and query topics represented by one or more query terms. Another object of the present invention is to provide a method and system for Web searching that is easy to use and cost-effective.

SUMMARY OF THE INVENTION

The invention is a general purpose computer programmed according to the inventive steps herein to rank documents in a set of documents in response to a query. The invention can also be embodied as an article of manufacture—a machine component—that is used by a digital processing apparatus and which tangibly embodies a program of instructions that are executable by the digital processing apparatus to find associations in computer-stored documents between document terms and query topics. This invention is realized in a critical machine component that causes a digital processing apparatus to perform the inventive method steps herein.

In accordance with the present invention, the computer includes computer readable code means for identifying a reference to a second document in a first document. Computer readable code means receive a lexical distance that defines a number of document terms. Also, the computer includes computer readable code means for receiving a query including one or more query terms, and computer readable code means for determining a number of times at least one of the query terms is present in the first document within the lexical distance of the reference to the second document, for ranking the documents based thereon.

In one embodiment, the documents are accessible via a wide area computer network, and the reference includes a uniform resource listing (URL). If desired, the lexical distance is established based on the query.

Preferably, the computer also includes computer readable code means for ranking multiple documents based on respective numbers of times query terms are present within lexical distances of references in the documents. Additionally, the computer includes computer readable code means for receiving a set "U" of documents. Computer readable code means are provided for defining as neighbor documents "N(u)", for at least one test document "u" in the set "U", documents in the set "U" that include at least one reference to the test document "u". Moreover, computer readable code means determine, for at least one document term in at least one neighbor document "N(u)", whether the at least one document term is within a predetermined distance (i.e., within a predetermined number of terms) of a reference in the neighbor document "N(u)" to the test document "u". Per the present invention, computer readable code means then output a signal in response to the means for determining whether the at least one document term is within a predetermined distance of a reference. The means for outputting increments a counter associated with the at least one document term when the at least one document term is within a predetermined distance of a reference to the test document "u".

In addition to the above-summarized logic, the computer can also include computer readable code means for receiving a set "U" of documents in response to a query including one or more query terms, with each document containing one or more document terms. Computer readable code means are provided for defining a correlation between at least a first document and at least a first document term when both the first document term and a reference to the first document are within a predetermined distance of a query term. If desired, the correlation is associated with a weight, and the weight is based on the number of times the first document term and a reference to the first document are within a predetermined distance of a query term in the set "U" of documents.

In another aspect, a computer program device includes a computer program storage device readable by a digital processing apparatus, and a program means on the program storage device and including instructions executable by the digital processing apparatus for performing method steps for finding key words in a set of documents. The method steps include receiving the set of documents, and then determining referring documents and referred-to documents in the set of documents, with the referring documents being documents in the set containing references to referred-to documents. For each document term in a referring document, the number of times the document term appears within a predetermined distance of a reference to a referred-to document is determined. At least some of the document terms in the documents are ranked based on the respective number of times. A computer is also disclosed for implementing the above-summarized program device.

In still another aspect, a computer-implemented method is disclosed for finding associations in computer-stored documents between document terms and query topics represented by one or more query terms. In accordance with the present invention, the documents have respective document names. The method includes receiving at least a list of documents in response to the query terms, and then, when a document term and a document name are both found in a document within a predetermined distance of a query term, outputting a signal representative of an association between the document term and the query topic. A computer is also disclosed for executing the above-summarized method.

In another aspect, a computer includes a data storage device that in turn includes a computer usable medium having computer usable code means for ranking documents in a set of documents in response to a query. The computer usable code means have computer readable code means for receiving a set "U" of documents, and computer readable code means for, for at least one test document "u" in the set "U", defining as neighbor documents "N(u)" documents in the set "U" that include at least one reference to the test document "u". Additionally, computer readable code means determine, for at least one document term in at least one neighbor document "N(u)", whether the document term is within a predetermined distance of a reference in the neighbor document "N(u)" to the test document "u". Computer readable code means then output a signal in response to the means for determining.

The details of the present invention, both as to its structure and operation, can best be understood in reference to the accompanying drawings, in which like reference numerals refer to like parts, and in which:

BRIEF DESCRIPTION OF THE DRAWINGS

FIG. 3 is a flow chart of the logic for growing a list of Web sites that have been provided in response to a query;

FIG. 4 is a flow chart of the logic for returning "high quality" pages from a list of pages generated in response to a query;

FIG. 5 is a flow chart showing the logic for finding descriptive terms (also referred to herein as features) across hyperlinks; and FIG. 6 is a flow chart showing the logic for finding associations in computer-stored documents between document terms and query topics represented by one or more query terms.

DETAILED DESCRIPTION OF THE PREFERRED EMBODIMENTS

Figure 1:
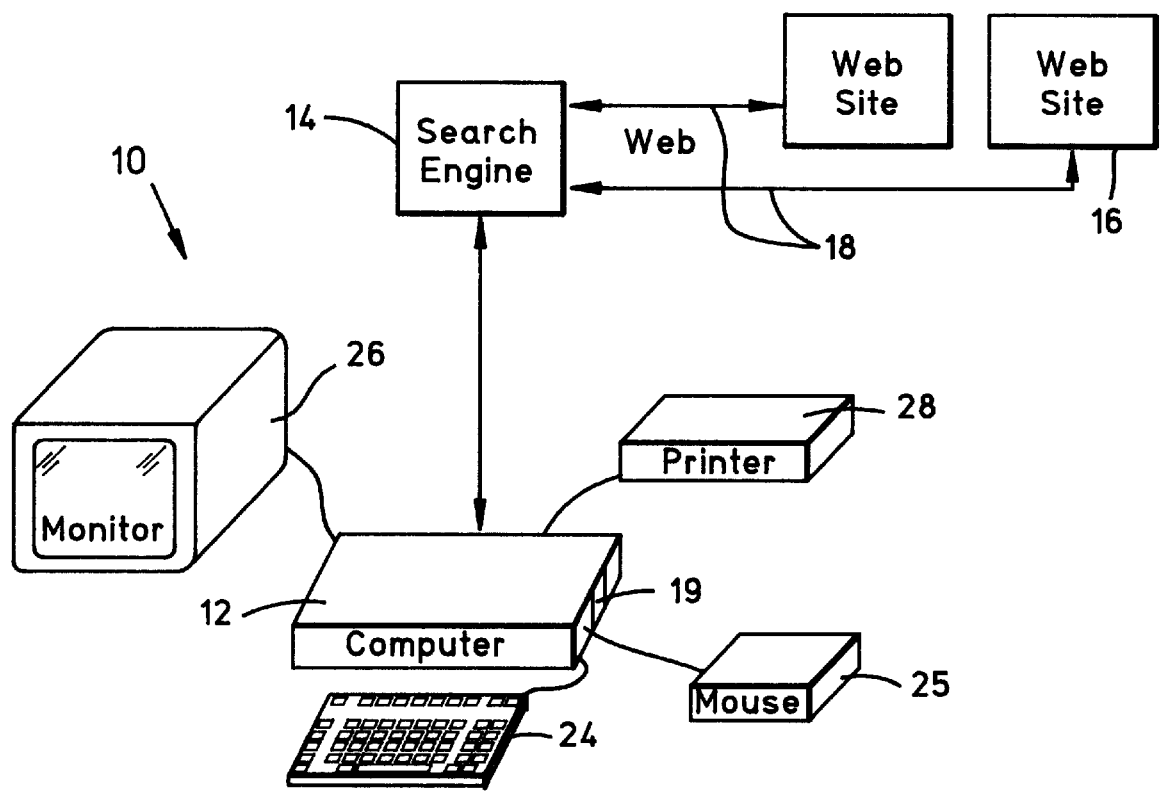
FIG. 1 is a schematic diagram of the present computer system for diffusing document features across hyperlinks.

Referring initially to FIG. 1, a system for finding descriptive terms across hyperlinks is shown, generally designated 10. In the particular architecture shown, the system 10 includes a digital processing apparatus, such as a computer 12. In one intended embodiment, the computer 12 may be a personal computer made by International Business Machines Corporation (IBM) of Armonk, N.Y. as shown, or the computer 12 may be any computer, including computers sold under trademarks such as AS400, with accompanying IBM Network Stations. Or, the computer 12 may be a Unix computer, or OS/2 server, or Windows NT server, or IBM RS/6000 250 workstation with 128 MB of main memory running AIX 3.2.5., or an IBM laptop computer.

The computer 12 accesses an Internet search engine 14. In one embodiment, the search engine 14 is made by Alta Vista, although it is to be understood that other search engines can be used. The search engine 14 accepts queries from the computer 12 and in response thereto returns to the computer 12 a list of computer-stored documents, and more particularly a list of Web sites 16, with which the computer 12 can communicate via the portion of the Internet known as the World Wide Web 18.

Additionally, the computer 12 includes a feature diffuser module 19 which may be executed by a processor within the computer 12 as a series of computer-executable instructions. These instructions may reside, for example, in RAM of the computer 12.

The flow charts herein illustrate the structure of the programmed instructions undertaken by the module 19 of the present invention as embodied in computer program software. Those skilled in the art will appreciate that the flow charts illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer) to perform a sequence of function steps corresponding to those shown.

In other words, the module 19 may be a computer program that is executed by a processor within the computer 12 as a series of computer-executable instructions.

Figure 2:
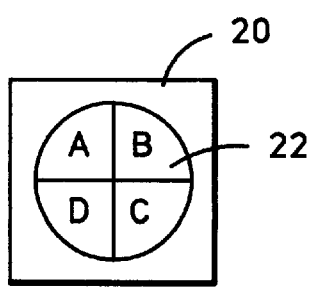
FIG. 2 is a schematic view of a computer program product.

Alternatively, the instructions may be contained on a data storage device with a computer readable medium, such as a computer diskette 20 shown in FIG. 2. The diskette 20 can include a computer usable medium 22 that electronically stores computer readable program code elements A–D. Or, the instructions may be stored on a DASD array, magnetic tape, conventional hard disk drive, electronic read-only memory, optical storage device, or other appropriate data storage device. In an illustrative embodiment of the invention, the computer-executable instructions may be lines of compiled C++ compatible code or Hypertext Markup Language (HTML) compatible code.

FIG. 1 also shows that the system 10 can include peripheral computer equipment known in the art, including an input device such as a computer keyboard 24 and/or computer mouse 25. Input devices other than those shown can be used, e.g., a trackball, keypad, touch screen, and voice recognition device. An output device such as a video monitor 26 is also provided. Other output devices can be used, such as printers, other computers, and so on.

Now referring to FIG. 3, the logic of the first procedure (referred to herein as "procedure A") that is undertaken by the module 19 can be seen. Commencing at block 28, a user query as might be input using the keyboard 24 is received. The user query is composed of one or more query terms, such as, e.g., "high mountains".

Moving to block 30, a lexical distance "l" is established. In one preferred embodiment, the lexical distance "l" defines a window in terms of an integer number of terms, for purposes to be shortly disclosed. The lexical distance "l" can have a fixed value or, as an alternative, the value of the lexical distance "l" can be established based on the number of terms in the query. For example, the value of the lexical distance "l" can be inversely proportional to the number of query terms.

At block 32, the query is sent to the search engine 14. In accordance with search engine principles, the search engine 14 returns a list of Web sites 16 that conform to the query. The list is returned in a results set "R", and the results set "R" is received at block 34. Typically, the results set is returned as a list of Web site names referred to as uniform resource locators or URLs.

Moving to block 36, the logic then expands the results set "R" as follows. First, all "s" URLs in which exist hyperlinks to one or more of the elements "r" in the results set "R" are added to the results set "R". Thus, at block 36 a reference to a second document is identified in a first document.

Next, at block 38 all "t" URLs are added to the results set "R", with a "t" URL being characterized as a URL to which hyperlinks exist from any element "r" in the results set "R", with the augmented set being denoted "S". Thus, at blocks 36 and 38 the results set "R" is grown into the augmented set "S" by adding URLs to the results set "R" that are either pointed to by a hyperlink in a URL in "R" or that point to a URL in R by means of a hyperlink.

From block 38, the logic moves to block 40 to enter a "DO" loop for each document in the augmented set "S". At decision diamond 42, it is determined whether any query term appears within the lexical distance of a URL "u" in the document, i.e., whether any query term appears in the document under test within the lexical distance of a hyperlink to the $u^{th}$ document in the augmented set "S". If so, a counter$_u$ that is associated with the $u^{th}$ document in the augmented set "S" is incremented by one at block 44, and then the next document is retrieved at block 46. Thus, the logic determines a number of times at least one of the query terms is present in a first document within the lexical distance of a reference to the second document, for ranking the documents based thereon as described below.

If the test is negative at decision diamond 42, the logic moves directly to block 46. From block 46, the logic moves to decision diamond 48 to determine whether the "DO" loop has been completed, and if not, the logic loops back to decision diamond 42. On the other hand, upon completion of the "DO" loop, the process moves to block 50 to return an ordered set of URLs in decreasing order of counter values.

Now referring to FIG. 4, a "B" procedure can be understood which seeks to reorder the top "N" URLs returned from procedure "A" on the basis of the significance of certain terms therein. Commencing at block 52, a set of documents is received. This set can be, e.g., the top "N" (e.g., 20) URLs output at block 50. For the set, a "DO" loop is entered, and an index variable "v" is set equal to the URL under test at block 54.

Moving to block 56, all (or a subset of) URLs "u" that cite the URL "v" under test (for example, by containing a hyperlink to the URL "v" under test) are determined. Next, moving to block 58 all anchor text in the URLs pertaining to hyperlinks to the URL "v" under test is retrieved.

By "anchor text" is meant the text that is directly associated with a hyperlink or other reference or citation in a document. For example, in the passage "One of the earliest high-energy nuclear accelerators was built at < A HREF= "http://www.CERN.ch">CERN, the European Laboratory for Particle Physics</A>", the hyperlink is the phrase "http://www.CERN.ch" and the anchor text is the material that is enclosed in the "<A> . . . </A>" pair. Using this example, for a lexical distance of, e.g., five, terms that are within the lexical distance of the anchor text are "nuclear accelerators was built at", whereas terms that are not within the lexical distance of the anchor text are "One of the earliest high-energy".

A nested "DO" loop is then entered at block 60 for each query term. Proceeding to decision diamond 62, it is determined whether the frequency of the query term under test in the document under test is greater than a reference frequency in some reference set of anchor text, as determined by one of a variety of conventional statistical techniques.

When the frequency of the query term under test in the document under test is greater than the reference frequency, the process moves to block 64 to flag the document under test as significant. Otherwise, the document under test is not flagged as significance. In either case, each document can be associated with a counter or other value representative of its significance as tested for above. At the conclusion of the "DO" loops discussed above, the top "N" URLs are ordered by their significance.

Now referring to FIG. 5, the logic of a "C" procedure for finding descriptive terms across hyperlinks is shown. Commencing at block 68, a set "U" of URLs "u" is received, and for each individual URL "u" in the set "U", a "DO" loop is entered. At block 70, the set of in-neighbors N(u) to the URL "u" under test is determined. By "in-neighbor" is meant a document in the set "U" of URLs that contains a hyperlink to the document "u" under test. Stated differently, the set N(u) of in-neighbors can be thought of as referring documents to the referred-to document "u".

A nested "DO" loop is entered into at block 72 for each element (i.e., document term) v in the set N(u) of in-neighbors. Moving to block 74, a counter$_v$ is associated with each term v in the set N(u) of in-neighbors. Then, a double-nested "DO" loop is entered. Proceeding to decision diamond 76, it is determined whether the term v under test is within a predetermined distance of a reference (e.g., hyperlink) to the document "u" under test. This predetermined distance can be the lexical distance discussed above. If the term v under test is within the predetermined distance of a reference to the document "u" under test, the counter$_v$ of the term is incremented by one at block 78. Otherwise, the counter$_v$ is not incremented. When all terms of all in-neighbors in the set N(u) of in-neighbors to all documents "u" in the set "U" of documents have been tested as set forth above, the logic moves to block 80 to sort the terms by their respective counter values, and to return the sorted list.

As recognized by the present invention, the output at block 80 is a ranked list of terms in the set "U" of documents. This ranked list can be used to suggest additional query terms to the user. Also, it can be used in an on-the-fly thesaurus of associations. Additionally, the output at block 80 can be used to annotate clusters of hyperlinked documents and clusters of terms as a post-processing step for many search engines.

FIG. 6 shows the logic of a procedure "D" for finding associations in computer-stored documents between document terms and query topics as represented by one or more query terms. Commencing at block 82, a query "Q" is received. The query "Q" is composed of one or more query terms "q".

The query is forwarded to a search engine at block 84, and in response a document list is received back from the search engine. Moving to block 86, a bipartite graph G=((T,U),E) is constructed having as its vertices the terms (T) and documents (U) returned at block 84, wherein T and U respectively represent a document term branch and a URL branch of the bipartite graph, and wherein E represents the edges between the branches.

Proceeding to block 88, a "DO" loop is entered for each document. Moving to block 90, the document is scanned for URLs "u" and query terms "q". Next moving to block 92, for each document term "t" and URL "u" found within a predetermined distance of a query term "q", a "DO" loop is entered in which the weight of the edge $(t,u) \in E$ is incremented by one at block 94. With this logic, when a document term and a document name or citation (in the form of a hyperlink) are both found in a document within a predetermined distance of a query term, a signal is output that represents an association between the document term and the query topic.

If desired, the "DO" loop can include proceeding to block 96, wherein a single value decomposition (SVD) is determined for a matrix A that is defined by the edges $E:a_{ij}$, wherein $a_{ij}$ is the weight of the edge from the $i^{th}$ term to the $j^{th}$ URL. As is well known in the art, the SVD determination at block 96 effectively factors $A=U^T \Sigma V$, where $\Sigma$ is a diagonal matrix containing the singular values of A, and U and V are orthogonal matrices for performing orthogonal transformations. A technique referred to in the art as Latent Semantic Indexing (LSI) such as that disclosed in U.S. Pat. No. 4,839,853, incorporated herein by reference, can be used to preprocess the corpus, and specifically to factorize the document-term matrix A as $U\Sigma V^T$, where U gives the linear projection from term space to what might be called LSI or concept space. A few hundred LSI dimensions "k" suffice.

LSI search, however, does not use the U matrix, but the present invention does use the U matrix as follows. Each term is mapped to LSI space, with each document being represented by a sequence of k-dimensional vectors. The query itself is transformed into a short sequence of such vectors. Then, the documents are scanned, and the logic attempts to match the query vectors with a small window of vectors in the documents. If a low-cost (i.e., "good") match exists, a large vote goes to nearby citations, i.e., hyperlinks. The cost can be evaluated using a min-cost matching strategy, where the edge cost of matching the vectors corresponding to terms $t_1$ and $t_2$ is simply the distance between their projections in U. As an example, the query "auto makers" may be matched at small cost to the sequence of text "companies making cars", voting for citations occurring near such similar phrases.

In contrast to LSI, the present invention maintains a sequence of LSI vectors for each document. In other words, the present invention, unlike LSI, considers matching LSI vector sequences and using the score to vote for neighboring citations.

If desired, the process can return suggested search terms to the user at block 98. To determine these suggested terms, the logic sorts the terms having projections on the left vector (i.e., first column of "U") of the SVD determined in block 96 in order of decreasing values. The top "k" terms in the sorted list are then returned at block 98, wherein "k" is a predetermined integer, e.g., five.

While the particular FEATURE DIFFUSION ACROSS HYPERLINKS as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

We claim:

1. A computer including a data storage device including a computer usable medium having computer usable code means for ranking documents in a set of documents in response to a query, the computer usable code means having:
   computer readable code means for identifying a reference to a second document in a first document;
   computer readable code means for receiving a lexical distance, the lexical distance defining a number of document terms;
   computer readable code means for receiving a query including one or more query terms; and
   computer readable code means for determining a number of times at least one of the query terms is present in the first document within the lexical distance of the reference to the second document, for ranking the documents based thereon.

2. The computer of claim 1, wherein the documents are accessible via a wide area computer network, and the reference includes a uniform resource listing (URL).

3. The computer of claim 2, wherein the lexical distance is established based on the query.

4. The computer of claim 2, further comprising computer readable code means for ranking multiple documents based on respective numbers of times query terms are present within lexical distances of references in the documents.

5. The computer of claim 1, further comprising:
   computer readable code means for receiving a set "U" of documents;
   computer readable code means for, for at least one test document "u" in the set "U", defining as neighbor documents "N(u)" documents in the set "U" that include at least one reference to the test document "u";
   computer readable code means for determining, for at least one document term in at least one neighbor document "N(u)", whether the at least one document term is within a predetermined distance of a reference in the neighbor document "N(u)" to the test document "u"; and computer readable code means for outputting a signal in response to the means for determining whether the at least one document term is within a predetermined distance of a reference.

6. The computer of claim 5, wherein the means for outputting increments a counter associated with the at least one document term when the at least one document term is within a predetermined distance of a reference to the test document "u".

7. The computer of claim 2, further comprising:

computer readable code means for receiving a set "U" of documents in response to a query including one or more query terms, each document containing one or more document terms; and computer readable code means for defining a correlation between at least a first document and at least one document term when both the document term and a reference to the first document are within a predetermined distance of a query term in the at least one of the documents.

8. The computer of claim 7, wherein the correlation is associated with a weight, and the weight is based on the number of times the document term and a reference to the first document are within a predetermined distance of a query term in the set "U" of documents.

9. A computer program device comprising:

a computer program storage device readable by a digital processing apparatus; and a program means on the program storage device and including instructions executable by the digital processing apparatus for performing method steps for finding key words in a set of documents, the method steps comprising:

receiving the set of documents;

determining referring documents and referred-to documents in the set of documents, the referring documents being documents in the set containing references to referred-to documents;

for each document term in a referring document, determining the number of times the document term appears within a predetermined distance of a reference to a referred-to document; and ranking at least some of the document terms in the documents based on the respective number of times.

10. The computer program device of claim 9, wherein the method steps further comprise incrementing a respective counter each time a document term appears within a predetermined distance of a reference to a referred-to document.

11. The computer program device of claim 9, wherein the method steps further comprise:

receiving a set "U" of documents in response to a query including one or more query terms; and defining a correlation between at least a first document and at least one document term when both the document term and a reference to the first document are within a predetermined distance of a query term.

12. The computer program device of claim 11, wherein the correlation is associated with a weight, and the weight is based on the number of times the document term and a reference to the first document are within a predetermined distance of a query term in the set "U" of documents.

13. The computer program device of claim 9, wherein the method steps further comprise:

receiving a lexical distance, the lexical distance defining a number of document terms;

receiving a query including one or more query terms; and determining a number of times at least one of the query terms is present in the first document within the lexical distance of the reference to the second document, for ranking the documents based thereon.

14. The computer program device of claim 13, wherein the documents are accessible via a wide area computer network, and the reference includes a uniform resource listing (URL).

15. The computer program device of claim 14, wherein the lexical distance is established based on the query.

16. The computer program device of claim 14, wherein the method steps further comprise ranking multiple documents based on respective numbers of times query terms are present within lexical distances of references in the documents.

17. A computer-implemented method for finding associations in computer-stored documents between document terms and query topics represented by one or more query terms, the documents having respective references to referred-to documents, the method comprising the steps of:

receiving at least a list of documents in response to the query terms; and when a document term and a reference to a referred-to document are both found in a document within a predetermined distance of a query term, outputting a signal representative of an association between the document term and the query topic.

18. The computer-implemented method of claim 17, wherein the outputting step includes:

constructing a bipartite graph having vertices, the vertices representing the documents received in the receiving step; and for at least some documents (u), and for at least some document terms (t) in each document (u), incrementing a weight of an edge (t, u) in the bipartite graph when the document term (t) and a reference to the document (u) are both found within a predetermined distance of a query term, the edge (t, u) representing the document (u) and document term (t).

19. The computer-implemented method of claim 17, further comprising the steps of:

determining referring documents and referred-to documents in the list of documents, the referring documents being documents in the list containing references to referred-to documents;

for each document term in a referring document, determining the number of times the document term appears within a predetermined distance of a reference to a referred-to document; and ranking at least some of the document terms in the documents based on the respective number of times.

20. The computer-implemented method of claim 17, further comprising the steps of:

receiving a lexical distance, the lexical distance defining a number of document terms;

determining a number of times at least one of the query terms is present in a first document within the lexical distance of a reference to the second document, for ranking the documents based thereon.

21. The computer-implemented method of claim 20, wherein the documents are accessible via a wide area computer network, and the reference to the second document includes a uniform resource listing (URL).

22. The computer-implemented method of claim 20, wherein the lexical distance is established based on the query terms.

23. The computer-implemented method of claim 20, further comprising the step of ranking multiple documents based on respective numbers of times query terms are present within lexical distances of references in the documents.

24. A computer including a data storage device including a computer usable medium having computer usable code means for finding associations in computer-stored documents between document terms and query topics represented by one or more query terms, the documents having respective references to referred-to documents, the computer usable code means having:

computer readable code means for receiving at least a list of documents in response to the query terms; and computer readable code means for outputting, when a document term and a reference to a referred-to document are both found in a document within a predetermined distance of a query term, a signal representative of an association between the document term and the query topic.

25. The computer of claim 24, wherein the means for outputting includes:

computer readable code means for constructing a bipartite graph having vertices, the vertices representing the documents received in the receiving step;

computer readable code means for incrementing, for at least some documents (u), and for at least some document terms (t) in each document (u), a weight of an edge (t, u) in the bipartite graph when the document term (t) and a reference to the document (u) are both found within a predetermined distance of a query term, the edge (t, u) representing the document (u) and document term (t).

26. The computer of claim 25, further comprising:

computer readable code means for determining referring documents and referred-to documents in the list of documents, the referring documents being documents in the list containing references to referred-to documents;

computer readable code means for determining, for each document term in a referring document, the number of times the document term appears within a predetermined distance of a reference to a referred-to document; and computer readable code means for ranking at least some of the document terms in the documents based on the respective number of times.

27. The computer of claim 26, further comprising:

computer readable code means for receiving a lexical distance, the lexical distance defining a number of document terms; and computer readable code means for determining a number of times at least one of the query terms is present in a first document within the lexical distance of a reference to the second document, for ranking the documents based thereon.

28. The computer of claim 27, wherein the documents are accessible via a wide area computer network, and the reference to the second document includes a uniform resource listing (URL).

29. A computer including a data storage device including a computer usable medium having computer usable code means for finding key words in a set of documents, the computer usable code means having:

computer readable code means for receiving the set of documents;

computer readable code means for determining referring documents and referred-to documents in the set of documents, the referring documents being documents in the set containing references to referred-to documents;

computer readable code means for determining, for each document term in a referring document, the number of times the document term appears within a predetermined distance of a reference to a referred-to document; and computer readable code means for ranking at least some of the document terms in the documents based on the respective number of times.

30. The computer of claim 29, further comprising computer readable code means for incrementing a respective counter each time a document term appears within a predetermined distance of a reference to a referred-to document.

31. The computer of claim 30, further comprising:

computer readable code means for receiving a set "U" of documents in response to a query including one or more query terms; and computer readable code means for defining a correlation between at least a first document and at least one document term when both the document term and a reference to the first document are within a predetermined distance of a query term.

32. The computer of claim 31, wherein the correlation is associated with a weight, and the weight is based on the number of times the document term and a reference to the first document are within a predetermined distance of a query term in the set "U" of documents.

33. The computer of claim 32, further comprising:

computer readable code means for receiving a lexical distance, the lexical distance defining a number of document terms;

computer readable code means for receiving a query including one or more query terms; and computer readable code means for determining a number of times at least one of the query terms is present in the first document within the lexical distance of the reference to the second document, for ranking the documents based thereon.

34. The computer of claim 33, wherein the documents are accessible via a wide area computer network, and the reference includes a uniform resource listing (URL).

35. A computer including a data storage device including a computer usable medium having computer usable code means for ranking documents in a set of documents in response to a query, the computer usable code means having computer readable code means for receiving a set "U" of documents;

computer readable code means for, for at least one test document "u" in the set "U", defining as neighbor documents "N(u)" documents in the set "U" that include at least one reference to the test document "u";

computer readable code means for determining, for at least one document term in at least one neighbor document "N(u)", whether the at least one document term is within a predetermined distance of a reference in the neighbor document "N(u)" to the test document "u"; and computer readable code means for outputting a signal in response to the means for determining whether the at least one document term is within a predetermined distance of a reference.

36. The computer of claim 35, wherein the means for outputting increments a counter associated with the at least one document term when the at least one document term is within a predetermined distance of a reference to the test document "u".

* * * * *